Dec. 2, 1958  P. W. CUMMINGS, JR., ET AL  2,862,895
METHOD OF RECOVERING CRUMB OF A POLYMER OF A POLYMERIZED
COMPOUND CONTAINING A SINGLE CH₂=C< GROUPING
FROM BY-PRODUCT MATERIAL SOLUTIONS
Filed Oct. 11, 1955
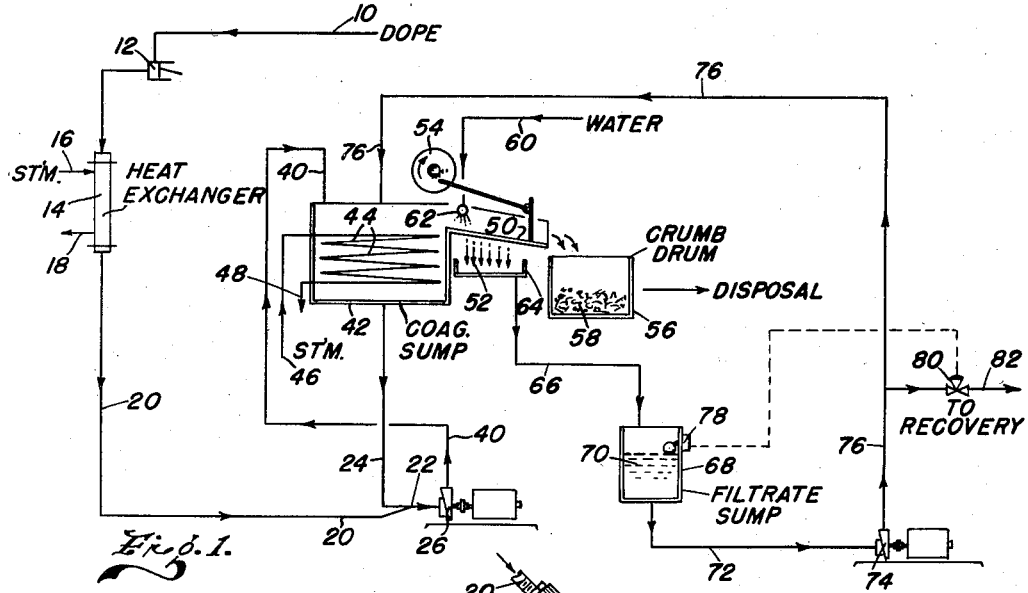
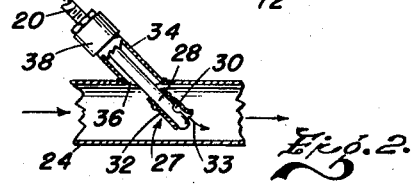
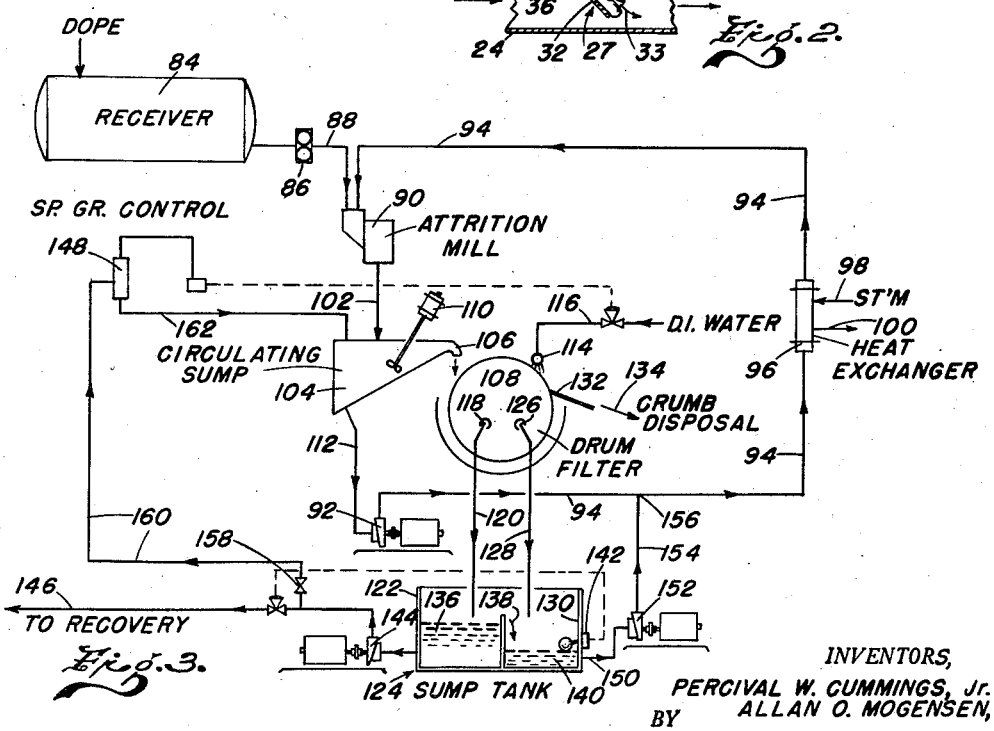
INVENTORS,
PERCIVAL W. CUMMINGS, Jr.
ALLAN O. MOGENSEN,
BY
Harold L. Kauffman
ATTORNEY.

United States Patent Office 2,862,895
Patented Dec. 2, 1958

2,862,895

METHOD OF RECOVERING CRUMB OF A POLYMER OF A POLYMERIZED COMPOUND CONTAINING A SINGLE $CH_2=C<$ GROUPING FROM BY-PRODUCT MATERIAL SOLUTIONS

Percival W. Cummings, Jr., Cos Cob, and Allan O. Mogensen, Stamford, Conn., assignors to American Cyanamid Company, New York, N. Y., a corporation of Maine Application October 11, 1955, Serial No. 539,753

13 Claims. (Cl. 260—2.3)

This invention relates broadly to the recovery of products from solutions, and more particularly to the treatment of waste dope, e. g., spinning solutions containing a fiber-forming (fiber-formable) synthetic polymer dissolved in a solvent, so that usable products can be obtained therefrom, or products which, after further treatment can be re-used in the original process from which the waste dope is derived, or products which are in acceptable form for waste disposal.

In the preparation of certain commercial articles or materials, for instance in the production of synthetic fibers or filaments from a fiber-forming polymeric material, a certain amount of waste dope inevitably results and this is true regardless of whether the fiber is produced by dry-spinning or by wet-spinning. For instance, such waste dopes may be off-grade batches collected at the blending dope storage tanks, at the deaerated dope storage tanks or at various stages of filtration in the spinning-dope system. Waste dopes also include contaminated dope, that is, dope which has been contaminated with dirt, coagulated lumps of polymer or any other extraneous material. It may include batches that have been spoiled by water or other liquid; dope obtained by bleeding lines; dope drained from polymer lumps or filter cloths; dope scraped from the floor or other site of spillage; and from various other sources.

In certain instances, for example, when the spinning dope or solution is a solution of a polymer of acrylonitrile (homopolymeric or copolymeric acrylonitrile) dissolved in a concentrated aqueous solution of a water-soluble salt that yields highly hydrated ions in an aqueous solution, e. g., sodium or calcium thiocyanate, zinc chloride, guanidine thiocyanate, etc., coagulated sheets and lumps of polymer frequently are produced, especially during start-up periods, when water falls into the dope or vice versa. Spillage of such dope, when washed up, also will yield sheets of polymer, and many of these are sticky with dope. Such coagulated sheets and lumps are so sticky with adhering dope that they cannot be conveniently handled by ordinary disposal methods. Furthermore, wastes that contain excessive amounts of some solvents for the polymer or constituents of such solvents, e. g., sodium thiocyanate, are generally unacceptable in ordinary sewage-disposal systems, since sodium thiocyanate is a chemical that consumes chlorine if present in the sewage, and will destroy plant and animal life.

It is a primary object of the present invention to provide a new and improved method of treating a waste dope, e. g., a dope comprised of a polymer of acrylonitrile and a liquid solvent therefor, whereby usable products are obtained therefrom; or products which, after further treatment can be re-used in the original process from which the waste dope is derived; or products which are in acceptable and easily handled form for waste disposal.

Other objects of the invention will be apparent to those skilled in the art from the following description.

The novel features of the invention are set forth in the appended claims. The invention itself, however, will be understood most readily from the following detailed description thereof when considered in connection with the accompanying drawing, which is illustrative of the invention and in which:

Fig. 1 is a flow sheet illustrating one embodiment of the invention;

Fig. 2 is a side elevational view, partly in section, showing a portion of the apparatus indicated generally in Fig. 1; and Fig. 3 is a flow sheet illustrating another embodiment of the invention.

The objects of the invention are attained by practicing the method of the invention as hereinafter fully described. The method involves treating waste dope comprising a liquid in which a polymer is dissolved by precipitating the polymer from the solvent in which it is dissolved, more particularly by dispersing the waste dope in a hot liquid which is a non-solvent for the polymer (that is, is incapable of dissolving the polymer) but which is miscible with the solvent for the polymer, thereby coagulating the polymer. Such a liquid may be generically described as a liquid coagulant. By thus dispersing and coagulating the waste dope in the hot liquid non-solvent, there is formed a slurry of polymeric solids dispersed in hot liquid. Immediately after effecting this dispersion of solids in the hot liquid, the slurry of at least partially coagulated polymer is subjected to a shearing stress, e. g., by passing the slurry through a centrifugal pump, by milling the solids while thus dispersed in the hot liquid or by various other means which will be apparent to those skilled in the art. The resulting polymer crumb is converted by this treatment to a friable state since, for one reason, the shearing force facilitates the penetration of the hot liquid into the coagulated polymer, and improves the action of the said liquid on the exposed surfaces of the particles of the coagulated polymer. The friable polymer crumb is then recovered from the slurry by suitable means, as is also the solvent in which the polymer originally was dissolved.

The waste dope which is processed in accordance with our invention may or may not be heated prior to admixture with the hot, liquid coagulant as desired or as conditions may require. If the waste dope originally is of very high viscosity so that pumping difficulties would be encountered if effort were made to pump the waste dope at normal temperature, then it may be heated by suitable means, e. g., by passage through a heat exchanger, to reduce its viscosity to a point where it readily can be pumped. The waste dope may be heated to any suitable temperature when it appears necessary or desirable to reduce its viscosity for pumping, e. g., from 40° or 50° C. to 90° or 95° C. or higher, depending upon the composition of the particular dope and the solvent employed in dissolving the polymer constituent of the dope.

An important aspect of our invention is based on the discovery that the physical characteristics of the polymer crumb are affected by the temperature of the liquid coagulant with which the waste dope is admixed in order to coagulate the dope and disperse the coagulated polymer in the coagulant. We have found that if the waste dope is admixed with a hot, liquid coagulant, e. g., one which is at a temperature ranging between about 65° C. and about 95° C., more particularly a temperature of from about 70° C. to about 90° C., then the polymer is obtained as a "cheesy" friable crumb. This is in marked distinction from the effect of cold water which, in producing a fiber of an acrylonitrile polymer from a spinning solution or dope of such a polymer dissolved in a concentrated aqueous solution of a water-soluble salt which yields highly hydated ions in an aqueous solution (e. g., a concentrated aqueous solution of sodium thiocyanate), results in a tough, strong, gelled structure of shaped polymer which is readily amenable to further processing in the production of a fiber.

Another important aspect of our invention is based on our discovery that the shearing stress to which the coagulated, dispersed polymer is subjected greatly facilitates the penetration of the liquid coagulant into, and action upon, the particles of coagulated polymer so that a further improvement is obtained in producing the desired friable crumb.

The waste dope is dispersed in an amount of the hot, liquid coagulant such as will yield a slurry (pumpable slurry) of polymeric solids dispersed in the hot liquid. Good results in securing a suitable slurry are generally obtained when the waste dope is dispersed in at least about an equal volume of hot, liquid coagulant, and which may range, for example, from 1 to 50 times the volume of waste dope.

The concentration of polymer (e. g., polyacrylonitrile) in the waste dope may vary widely, e. g., from about 5 to about 20% by weight thereof in the case of most waste fiber-forming polyacrylonitrile dope, and either less or more with non-fiber-forming polyacrylonitrile dopes or with waste dopes containing other polymers. Taking a waste dope of a polyacrylonitrile as an example, the concentration of polymer in the said dope and the volume ratio of said dope to the liquid coagulant (e. g., a liquid coagulant comprising a dilute aqueous solution of sodium thiocyanate), in which the dope is dispersed to form a slurry of polymer solids, advantageously are such that the slurry contains, by weight, from about 0.4% or 0.5% to 10% or 15%, preferably from about 0.6% to about 3% or 4%, of acrylonitrile polymer solids. Similar proportions, or lower or higher (as desired or as may be required), can be used with waste dopes containing other coagulable polymers.

Our invention is applicable, to the best of our knowledge and belief, to the treatment of any waste dope comprising a coagulable polymer dissolved in a solvent for which miscible liquids are known. The process is especially applicable in the treatment of waste dopes comprising a polymer of acrylonitrile and a solvent of the kind just mentioned, e. g., a concentrated aqueous solution of a water-soluble salt which yields highly hydrated ions in an aqueous solution, and more specifically a concentrated aqueous solution of sodium thiocyanate. One process of producing a fiber of a polyacrylonitrile from a solution of an acrylonitrile polymer dissolved in the aforementioned solvent is desribed in, for instance, Cresswell U. S. Patent Nos. 2,558,730, -1, -2 and Cresswell and Wizon U. S. Patent No. 2,558,733, all of which are dated July 3, 1951. Illustrative examples of the water-soluble salts that can be used in producing and using the solvent for the acrylonitrile polymer, as is described more fully in the aforementioned patents, are those mentioned in the said patents and also in Rein U. S. Patent No. 2,140,921 dated December 20, 1938. Such salts include the chlorides, bromides, iodides, thiocyanates, perchlorates and nitrates (see the aforementioned Rein patent for additional information) and the concentrated aqueous solutions of which are the preferred solvents for the acrylonitrile polymer. Saturated or nearly saturated aqueous solutions of such salts in some cases may be used. More specific examples of such water-soluble inorganic salts are zinc chloride, calcium chloride, lithium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These latter solutions containing dissolved polymeric or copolymeric acrylonitrile are more fully described and are specifically claimed in Cresswell U. S. Patent No. 2,533,224 dated December 12, 1950.

With reference now to the accompanying drawing, and more particularly to the flow sheet of Fig. 1:

Waste dope from a supply source (not shown) flows through line 10 to the dope-disposal system. This dope may be described more particularly, for purpose of illustrating the invention and not by way of limitation, as a waste spinning solution containing, for instance, from 5% to 20% by weight of a polymer of acrylonitrile (e. g., homopolymeric acrylonitrile or a copolymer of, by weight, 85–95% acrylonitrile and 5–15% of one or more different copolymerizable ethylenic compounds, for instance, vinyl acetate, methyl acrylate, acrylamide, acrylic acid, 2-methyl-5-vinylpyridine, etc.), said acrylonitrile polymer being dissolved in a concentrated aqueous solution of a water-soluble salt which yields highly hydrated ions in an aqueous solution, e. g., a 46–52% (by weight) aqueous solution of sodium thiocyanate.

The waste dope is pumped by the pump 12 through a heat exchanger 14 in which it is heated indirectly by means of steam or other hot fluid medium that enters the exchanger through inlet conduit 16 and leaves through outlet conduit 18. The pump 12 may be, for example, a piston or any other postive-displacement pump. From the heat exchanger the hot, waste dope flows through line 20 to point 22 where it enters at a relatively high velocity, and is quickly admixed with, a flowing stream of hot, dilute (e. g., about 3–15% by weight), aqueous solution of sodium thiocyanate. The latter solution flows to the point 22 through the line 24. The mixing of the two flowing streams of liquids at point 22 occurs immediately before the entry of the mixed streams into the input of a centrifugal pump 26. The volumes of the two flowing streams at the point 22, where they are admixed, is advantageously such that the waste dope is dispersed in at least about an equal volume of hot coagulating liquid, e. g., from 1 to 50 times the volume of waste dope. For instance, the waste dope may be pumped through line 20 at the rate of from 1 to 3 gallons per minute, and the hot, liquid coagulant through line 24 at the rate of from 5 to 30 gallons per minute.

Instead of using a hot (e. g., 65–95° C.), dilute, aqueous thiocyanate solution as the dispersing medium or liquid coagulant, one can employ any other hot liquid coagulant, e. g., at a temperature ranging between about 65° C. and about 95° C., that is a non-solvent for the polymer but is miscible with solvent for the polymer.

Referring now to Fig. 2, which shows in more detail the means employed for bringing together at point 22 the two different streams of liquids flowing through lines 20 and 24:

The hot dope flowing through the line 20 enters the stream of hot, dilute, aqueous sodium thiocyanate solution that is flowing through the line 24 through a Bunsen type of valve 27. The valve 27 may be formed, for example, by providing the end 28 with an opening or aperture 30 on a side thereof, and then enveloping this opening with a covering 32 formed of a flexible, plastic material. This covering is so attached to the end 28 and so arranged about the opening that it will permit egress of the hot dope into the flowing stream of hot, dilute, aqueous thiocyanate solution, as indicated by the arrow 33 in Fig. 2, but will prevent ingress of the latter into the line 20 containing the hot dope solution. The angularly disposed tube 34 is welded to the line 24 at the opening 36 therein. This tube is externally threaded at its upper end, and is larger in diameter than the line 20 to which it is attached by means of the coupling 38. This arrangement provides convenient means for making the connection between lines 20 and 24 and for removal of the valve 27 for inspection and replacement when necessary.

In the centrifugal pump 26 the already partially-coagulated stream of dope is broken up by the strong shearing forces set up by the pump into a "cheesy," friable crumb. This crumb, slurried in the hot, dilute, aqueous sodium thiocyanate solution, issues from the output of the centrifugal pump 26 and passes through the line 40 to the coagulation sump 42. In this sump the slurry of crumb is heated by suitable means, for instance, by means of the closed heating coil 44 to which steam or other hot fluid medium is introduced through the inlet conduit 46 and is withdrawn through the outlet conduit 48. The flow of slurried crumb into sump 42 and overflow therefrom are so regulated that the average residence time of the slurry in the sump is sufficient to cause substantially complete coagulation of the precipitated polymer.

A screen 50 is an integral part of coagulation sump 42, and permits separation of the slurry in sump 42 into moist crumb and supernatant liquor. The slurry of substantially completely coagulated polymer or crumb overflows from the sump 42 on to the screen 50, which retains the solid crumb and allows the passage of liquor therethrough, as indicated by the downwardly pointing arrows 52.

By means of a suitable shaking device, e. g., the device 54 which provides oscillatory linear motion from circular motion, the screen 50 is shaken up and down. This action causes the solid crumb to advance toward the discharge end of the screen, and from which point it falls into the crumb drum or collecting vessel 56. The thusly collected crumb 58 is removed from the vessel when required and taken to waste disposal if it is unsuitable for re-use; or, if the vessel 56 is of the portable type, e. g., a drum, the filled drum may be replaced by an empty drum, in which latter the crumb is then collected while the filled drum is being emptied.

The shaking action of the device 54 also assists in separating liquor and wash water from the crumb. Fresh water flows through the line 60 to the spray 62 placed above the screen 50, and is sprayed upon the crumb while it is being shaken by, and is advancing along, the aforesaid screen. The liquor and wash effluent become admixed and flow into a trough or other suitable collecting vessel 64, and thence through the line 66 into the filtrate sump 68.

The dilute liquor or filtrate 70 passes from the sump 68 through the line 72 to the centrifugal pump 74. If the level of filtrate in the sump 68 is low, the filtrate is pumped by pump 74 through the line 76 back to the coagulation sump 42. However, if the level of filtrate in sump 68 is high enough to actuate valve-control device 78, which controls valve 80, then the filtrate from the sump 68 is pumped, by means of the centrifugal pump 74, through a portion of the line 76 and thence through the line 82 to a thiocyanate recovery system instead of passing to the coagulation sump 42.

A preferred embodiment of the invention, which is illustrated by the flow sheet of Fig. 3, may be briefly described as follows:

Waste dope is pumped into the suction of an attrition mill together with hot, dilute (e. g., about 3–15% by weight), aqueous sodium thiocyanate solution, milled and continuously discharged into an agitated, circulating sump. Provisions are made so that the contents of the circulating sump, along with diluted thiocyanate solution, can be recirculated back through the milling operation. The circulating sump overflows into a suitable filter, e. g., a rotary vacuum filter. The solid crumb that is separated by the filter is washed, e. g., with fresh, deionized water, or with condensate from the evaporator of a thiocyanate recovery system, and is then collected for disposal. The filtrate is split into two streams: one stream is sent to a sodium thiocyanate recovery system, while the remainder is mixed with the wash liquor, the mixture is heated by passage through a heat exchanger and then fed to the attrition mill.

With further reference to Fig. 3, the process illustrated by the flow sheet of that figure may be described more fully as follows:

Waste dope is collected in a waste-dope storage receiver 84, from which it is pumped (usually without being heated if its viscosity is sufficiently low that it can be easily pumped) by means of a gear or other positive-displacement pump 86 through line 88 to the suction or in-take end of an attrition mill 90. Into the suction end of this mill is also pumped a stream of water or of dilute, aqueous sodium thiocyanate solution. This "solution" (by which term is included water alone if used) is pumped to the mill 90 by means of the centrifugal pump 92 through the line 94, being heated, prior to discharge to the said mill, to a temperature of, for example, about 65° C. to about 95° C., the minimum and maximum temperatures usually being from about 70°–75° C. to about 85°–90° C. The solution (liquid coagulant) can be brought to this temperature by any suitable means, for instance by passing it through the heat exchanger 96 wherein it is heated indirectly by means of steam or other hot fluid medium that enters the exchanger through the inlet conduit 98 and leaves through outlet conduit 100.

In the mill 90 the waste dope is brought into intimate contact with the hot, liquid coagulant (the relative volumes of each being, for instance, as described above with reference to Figs. 1 and 2), so that the coagulated polymer which is first formed is then broken up into a "cheesy," friable crumb. The slurry of this crumb in the aforesaid liquid coagulant, specifically a dilute, aqueous sodium thiocyanate solution, passes from the discharge end of the attrition mill through the line 102 into the circulating sump 104. This sump is provided with a cover, and also with a sloping bottom to secure proper overflowing of the slurry at the overflow end 106 into the filter 108, which advantageously may be a rotary vacuum or drum filter. The slurry in sump 104 is suitably agitated, e. g., by means of the agitator 110, in order to keep the finely divided, coagulated, polymer crumb in suspension.

The main portion of the slurry in circulating sump 104 is pumped through the line 112 into the in-take of pump 92 and from the discharge end of the said pump through the line 94 and the heat exchanger 96 back to the attrition mill 90. The portion of slurry that overflows into the filter 108 is thereby filtered to separate the moist crumb from the dilute, aqueous thiocyanate solution.

The filtrate of dilute, aqueous thiocyanate solution passes through the filter outlet 118 and the line 120 into one section 122 of a suitable receiving vessel or sump tank 124. The solid crumb which is separated by the filter is washed with deionized water or other wash liquid, e. g., by means of the spray 114, which is supplied with wash liquid through the line 116 from a supply source (not shown). The washings of relatively more dilute sodium thiocyanate solution pass through the filter outlet 126 and the line 128 into another section 130 of the tank 124.

After being washed, the moist crumb is removed from the filter by suitable means, e. g., by blade 132, and thence passes to crumb disposal as indicated by the arrow 134.

The main portion of the relatively strong sodium thiocyanate solution 136 in section 122 of the tank 124 overflows, as indicated by the arrow 138, into the section 130 of the said tank and is therein admixed with the relatively weak thiocyanate solution 140 comprised of the aforesaid washings. If the weaker solution 140 in section 130 reaches a high level, a control 142 is actuated, allowing a pump 144 to pump the solution 136 through the line 146 to the thiocyanate recovery area instead of overflowing into section 130 to become admixed with solution 140.

A specific gravity control 148 measures the specific gravity of the solution 136 and adjusts the amount of deionized water or other wash liquid flowing through the line 116 to the spray 114, thereby controlling the amount of washings or solution 140 that passes through the line 128 to the section 130. To effect this result, a small amount of solution 136 is pumped by centrifugal pump 144 through a manually operated control valve 158 and through line 160 into the chamber of the specific gravity control 148 from which the overflow passes through the line 162 to the circulating sump 104. If the specific gravity of solution 136 is higher than is desired, more deionized water is permitted to flow through the line 116 to the spray 114.

The relatively weak sodium thiocyanate solution 140 in section 130 is pumped through the line 150 into the suction end of the pump 152 and from the discharge end thereof passes through the line 154 to connect with line 94 at the point 156. At this point it enters the stream of slurry which is being pumped from the circulating sump 104 to the attrition mill 90.

In order that those skilled in the art may better understand the present invention, the following examples are given by way of illustration and not by way of limitation. All parts and percentages are by weight.

*Example 1*

A twenty-gallon, glass-lined kettle is fitted with a high-speed agitator with two three-bladed propellors on the same shaft set so that the lower one impels upwards and the upper one downwards. The kettle is filled with water which has been heated with live steam to about 85°–90° C. A beaker containing three quarts of waste dope is held about two feet above the surface, and the dope is poured in, in about 10–15 seconds, with no agitation. The waste dope is comprised of about 10% by weight of a copolymer of about 95% acrylonitrile and 5% methyl acrylate dissolved in about a 52% solution of sodium thiocyanate. After about three minutes the stirrer is turned on. A coarse, friable crumb of acrylonitrile copolymer, readily dispersed in the water, is observed. After standing undisturbed for about 16 hours, the crumb is screened off and found to contain 9% NaSCN (bone dry basis).

The above test is repeated, pouring five liters of the waste dope in 13 seconds into the aforementioned kettle with the agitator operating. No clogging of the agitator blades is observed, and the same coarse, friable crumb is obtained. After standing overnight it is screened off and found to contain 22% NaSCN (bone dry basis). The crumb thus obtained is acceptable for disposal at city dumps.

The friable crumb can be washed with water to recover the sodium thiocyanate therein, if desired.

*Example 2*

The following example illustrates how our invention can be practiced on a small scale. The apparatus involved includes an arrangement whereby the waste dope can fall on a swirling layer of water in a suitable funnel; a tube of glass or of other suitable material through which the coagulated polymer crumb can be passed to an attrition device, e. g., an ordinary meat grinder; and means for washing the coagulated polymer both in the aforementioned tube and attrition device with recirculating water or other suitable wash fluid.

When the waste dope, which is of the same general composition as that employed in Example 1, falls on the swirling layer of water in the funnel, it forms a "worm" of cheesy, friable polymer which is washed down the tube through the meat grinder, and from which it emerges as a coarsely ground crumb. The water also passes through the meat grinder and through a screen into a tank from which it is recirculated to the funnel. The crumb falls on the screen and is retained.

The test is started with 5 liters of water, at 90° C., in the system. After five minutes of operation a volume of 650 cc. of dope has been converted; the temperature has dropped to 60° C., and the concentration of NaSCN in the recirculating liquor has risen to 8%. This is considered adequate to show that the system can be operated continuously in this manner, using 8–10% NaSCN in the coagulating liquor and bleeding off enough to recovery to maintain equilibrium. The ground crumb is given three successive hot water (90° C.) washes. The wet weight of crumb is about 300 g. after vacuum filtration in a Büchner funnel. It is washed each time in 900 cc. of 90° C. water by stirring for 15 minutes. Then the crumb is filtered again by vacuum and the whole process is repeated.

| Condition of crumb | Moisture in crumb, weight percent, BDB [1] | NaSCN in crumb, weight percent, BDB [1] | NaSCN in wash liquor, percent by weight |
|---|---|---|---|
| A. Before 1st wash | 17.3 | 29.8 | 8 |
| B. After 1st wash | 28.3 | 3.6 | 1.2 |
| C. After 2nd wash | 31.3 | 0.2 |  |
| D. After 3rd wash | 33.6 | 0.01 |  |

[1] BDB = bone dry basis.

The crumb which has been washed three times is found to be readily hydrolyzed to a polyacrylic acid.

It will be understood, of course, by those skilled in the art that our invention is not limited to the specific methods illustrated in the flow sheets of the accompanying drawing and described hereinbefore with reference to that drawing; or to the use of the particular apparatus shown in the drawing and referred to in the forepart of this specification; or to the particular method and apparatus used in the foregoing examples; or to the particular waste dopes and hot, liquid coagulants or dispersion media mentioned hereinbefore by way of example.

Thus, instead of a waste dope comprising a coagulable polymer of acrylonitrile and a liquid solvent for said polymer, we can use any other waste dope comprised or composed of (1) a coagulable polymer of any other polymerizable substance and (2) a liquid solvent for said polymer. The invention is particularly applicable, from an economic standpoint, to those waste dopes which contain a water-coagulable polymer, and especially those water-coagulable polymers that are changed in their physical structure by the treatment so that they can be isolated or recovered in a state or form in which they can be readily handled, e. g., in a friable or somewhat friable state.

Our invention is valuable in the treatment of a waste dope comprised of a polymer of acrylonitrrie and a liquid solvent therefor, e. g., a concentrated aqueous solution of sodium thiocyanate or other salt of the kind aforementioned. The acrylonitrile polymers include fiber-forming (fiber-formable) homopolymeric acrylonitrile and fiber-forming (fiber-formable) acrylonitrile copolymers (thermoplastic acrylonitrile copolymers) containing in the polymer molecules an average of, for example, at least about 40%, preferably at least about 75%, by weight of combined acrylonitrile. Taking as an example the expression "an acrylonitrile polymer containing in the polymer molecules an average of at least about 40% by weight of combined acrylonitrile," this means herein a polymerization product (homopolymer, copolymer or graft polymer or mixtures thereof) containing in the molecules thereof an average of at least about 40% by weight of the acrylonitrile unit, which is considered to be present in the individual polymer molecule as the group

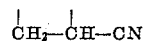

or, otherwise stated, at least about 40% by weight of the reactant substance converted into and forming the polymerization product is acrylonitrile. The expression "an acrylonitrile polymer containing in the polymer molecules an average of at least about 75% by weight of combined acrylonitrile" has a similar meaning herein.

Illustrative examples of monomers which may be copolymerized with acrylonitrile to yield a polymerization product containing in the polymer molecules an average of at least about 40%, preferably at least about 75%, by weight of combined acrylonitrile are compounds containing a single $CH_2=C<$ grouping, for instance, the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, ethallyl alcohol, etc.; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers, e. g., the dimethyl, -ethyl, -propyl, -butyl, etc., esters of maleic, fumaric, citraconic, etc., acids.

The present invention can be used in the treatment of waste dopes containing an acrylonitrile polymer (homopolymeric or copolymeric acrylonitrile) of the kind described above by way of example. Ordinarily, their molecular weight (average molecular weight) is within the range of 25,000 or 30,000 to 200,000 or 300,000 or higher, and advantageously is of the order of 50,000 to 100,000, e. g., about 70,000–80,000, as calculated from a viscosity measurement of the said polymerization product in dimethyl formamide using the Staudinger equation (reference: U. S. Patent No. 2,404,713). The solvent component of the waste dope may be a concentrated aqueous solution of a water-soluble salt that yields highly hydrated ions in an aqueous solution (numerous examples of which have been given hereinbefore) or any other known solvent for an acrylonitrile polymer. Examples of such known solvents are given in, for instance, the following U. S. Patents: 2,404,714—Latham; 2,404,715—Rogers; 2,404,716—Hansley; 2,404,717, -18, -19, -20, -21, -22, -24 and -27—Houtz; 2,404,723—Merner; and 2,404,725—Rogers, all dated July 23, 1946. Liquid coagulants into which the spinning solution or dope comprised of the acrylonitrile polymer and the solvent therefor can be extruded to precipitate the polymer also are mentioned in these patents, e. g., water, glycerol, alcohol, ether, aqueous solutions of salts, acids, etc.

Other examples of polymers of which the waste dope may be comprised are homopolymers and copolymers (coagulable homopolymers and copolymers), the latter in any proportions, of those monomers mentioned hereinbefore as illustrative examples of monomers which can be copolymerized with acrylonitrile. Such waste dopes, of course, include a solvent for the polymer, and they are amenable to treatment by the method of the invention.

We claim:

1. The method of recovering crumb of a water-insoluble polymer of a polymerizable compound containing a single $CH_2=C<$ grouping from by-product material containing at least some of the said polymer as the sole polymeric constituent and being dissolved in a liquid solvent therefor, said method comprising precipitating the said polymer from the liquid solvent in which it is dissolved by dispersing the said by-product material in a hot liquid comprising water which is at a temperature ranging between about 65° C. and about 95° C., said hot liquid being incapable of dissolving the said polymer but being miscible with the aforesaid solvent, and whereby there is formed a slurry of polymeric solids dispersed in the said hot liquid; subjecting the said polymeric solids while dispersed in the said hot liquid to a shearing stress; and recovering the resulting polymer crumb from the slurry.

2. A method as in claim 1 wherein the water-insoluble polymer is a polymer of acrylonitrile and the said by-product material is heated prior to being dispersed in the hot liquid which is incapable of dissolving the polymer of acrylonitrile but which is miscible with the solvent for the said polymer.

3. The method of recovering a friable crumb of a polymer of acrylonitrile from by-product material containing the said polymer dissolved in a solvent which is a concentrated aqueous solution of a water-soluble salt that yields highly hydrated ions in an aqueous solution, said method comprising dispersing the said by-product material in at least about an equal volume of a liquid which is at a temperature ranging between about 65° C. and about 95° C., said liquid being incapable of dissolving the said polymer of acrylonitrile and being miscible with the said solvent for the said polymer, thereby to form a slurry of solids of an acrylonitrile polymer dispersed in the said liquid; subjecting the said solids while dispersed in the hot liquid to a shearing stress; and recovering the resulting friable crumb of a polymer of acrylonitrile from the slurry.

4. A method as in claim 3 wherein the solvent in which the polymer is dissolved is a concentrated aqueous solution of a water-soluble thiocyanate.

5. A method as in claim 4 wherein the water-soluble thiocyanate is sodium thiocyanate.

6. The method of treating a by-product material containing an acrylonitrile polymer dissolved in a concentrated aqueous solution of sodium thiocyanate, said method comprising dispersing the said by-product material in at least about an equal volume of a liquid comprising water which is at a temperature of from about 70° C. to about 90° C., said liquid being incapable of dissolving the said acrylonitrile polymer and being miscible with the said concentrated aqueous solution of sodium thiocyanate, thereby to form a slurry of solids of an acrylonitrile polymer dispersed in the said liquid; subjecting the said solids while dispersed in the hot liquid to a shearing stress; and recovering from the slurry both the resulting friable crumb of acrylonitrile polymer and a dilute aqueous solution of sodium thiocyanate.

7. A method as in claim 6 wherein the liquid comprising water in which the by-product material is dispersed is a dilute aqueous solution of sodium thiocyanate, said solution being incapable of dissolving the said acrylonitrile polymer.

8. A method as in claim 6 wherein the shearing stress to which the solids of acrylonitrile polymer are subjected while dispersed in the hot liquid is that provided by passing the slurry through a centrifugal pump.

9. The method of treating by-product material containing an acrylonitrile polymer dissolved in a concentrated aqueous solution of sodium thiocyanate, said method comprising dispersing the said by-product material in at least about an equal volume of a liquid comprising a dilute aqueous solution of sodium thiocyanate, said liquid being incapable of dissolving the acrylonitrile polymer and being at a temperature of from about 70° C. to about 90° C., thereby to form a slurry of solids of an acrylonitrile poymer dispersed in the said liquid;

milling the said solids while thus dispersed, thereby to subject them to a shearing stress and to facilitate the penetration therein of the said liquid in which they are dispersed; and recovering from the slurry both the resulting friable crumb of acrylonitrile polymer and a dilute aqueous solution of sodium thiocyanate.

10. A method as in claim 9 wherein the concentration of acrylonitrile polymer in the by-product material and the volume ratio of said by-product material to the liquid comprising a dilute aqueous solution of sodium thiocyanate in which the by-product material is dispersed to form a slurry of polymer solids are such that the slurry contains from about 0.5% to about 3% by weight of acrylonitrile polymer solids.

11. A method as in claim 10 wherein the liquid comprising a dilute aqueous solution of sodium thiocyanate in which the by-product material is dispersed is at a temperature of from about 75° C. to about 85° C.

12. The method of recovering crumb of an acrylonitrile polymer from by-product material containing an acrylonitrile polymer dissolved in a 46–52%, by weight, aqueous solution of sodium thiocyanate, said method comprising dispersing the said material in a hot liquid comprising water at a temperature ranging between about 65° C. and about 95° C., said hot liquid being incapable of dissolving the said acrylonitrile polymer, and whereby there is formed a slurry of solids of an acrylonitrile polymer dispersed in the said hot liquid; subjecting the said solids while dispersed in the said hot liquid to a shearing stress; and recovering the resulting polymer crumb from the slurry.

13. The method of obtaining a friable crumb of an acrylonitrile polymer and a dilute aqueous solution of sodium thiocyanate from by-product material containing an acrylonitrile polymer dissolved in 46–52%, by weight, aqueous solution of sodium thiocyanate, said method comprising dispersing the said by-product material in a hot, aqueous solution of sodium thiocyanate containing about 3–15% by weight of said thiocyanate and being at a temperature ranging between about 65° C. and about 95° C., said aqueous solution being incapable of dissolving the said acrylonitrile polymer, and whereby there is formed a slurry of solids of an acrylonitrile polymer dispersed in the said hot, aqueous solution; subjecting the said solids while dispersed in the said hot, aqueous solution to a shearing stress; and recovering from the slurry both the resulting friable crumb of acrylonitrile polymer and a dilute aqueous solution of sodium thiocyanate.

References Cited in the file of this patent

UNITED STATES PATENTS

| | | |
|---|---|---|
| 2,140,921 | Rein | Dec. 20, 1938 |
| 2,356,896 | Smith | Aug. 29, 1944 |
| 2,459,748 | Johnson | Jan. 18, 1949 |

UNITED STATES PATENT OFFICE

CERTIFICATE OF CORRECTION

Patent No. 2,862,895                                                December 2, 1958

Percival W. Cummings, Jr., et al.

It is hereby certified that error appears in the above numbered patent requiring correction and that the said Letters Patent should read as corrected below.

In the heading to the drawings, line 2, and in the heading to the printed specification, line 4, in the title of invention, for "POLYMERIZED" read -- POLYMERIZABLE --; column 2, line 15, after "hereinafter" insert -- more --; column 3, line 50, for "desribed" read -- described --; column 4, line 48, after "with" insert -- the --; column 5, line 18, for "on to" read -- onto --; column 8, line 52, for "acrylonitrie" read -- acrylonitrile --; column 9, line 16, for "unsaurated" read -- unsaturated --; column 10, line 75, for "poymer" read -- polymer --.

Signed and sealed this 17th day of March 1959.

(SEAL)
Attest:
KARL H. AXLINE
Attesting Officer

ROBERT C. WATSON
Commissioner of Patents